Dec. 23, 1952 — A. J. LUTH — 2,622,559
SANITARY TEAT CUP PROTECTOR
Filed March 6, 1950

INVENTOR
ARNO J. LUTH

BY *Young & Wright*

ATTORNEYS

Patented Dec. 23, 1952

2,622,559

UNITED STATES PATENT OFFICE 2,622,559

SANITARY TEAT CUP PROTECTOR

Arno J. Luth, Oconto Falls, Wis.

Application March 6, 1950, Serial No. 147,833

2 Claims. (Cl. 119—14.47)

This invention appertains to milking, and more particularly to a novel sanitary protector for the teats of cows, which is especially useful where milking machines are employed.

The usual milking machine teat cup or inflation has a substantially greater volume than is required by the usual size of cow teat. The milking machine teat cup or inflation is also quite rigid (although collapsible under pulsation) and does not conform to the size and shape of the teat, but is considerably larger. Hence during the milking process, the outside of the teat is completely surrounded by fresh milk in constant state of friction agitation and the outside surface of the teat is continuously washed with fresh milk. Thus the folds of the skin of the teat are flexed and reflexed and cleansed by the fresh milk of dirt, soil, bacteria and other matter which passes into the milk supply. The mechanical action of the modern milking machine teat cup or inflation exerts more force in greater area to remove dirt and bacteria in a solution of warm milk than is exerted by the usual washing of the teat by hand.

It is, therefore, one of the primary objects of my invention to provide a thin, resilient sleeve for intimate close gripping contact with the teat of the cow for completely covering the teat, whereby the milk during the pulsation of the teat cup or inflation will pass around the sleeve in lieu of around the teat itself, the sleeve having a small opening at its outer end for the direct passage of milk from the teat into the inflation.

Another salient object of my invention is to provide a resilient flexible finger-like member for gripping contact with the entire area of a cow's teat, which can be readily associated with a milking machine cup and readily withdrawn from the cup with the teat for cleansing purposes.

A further important object of my invention is the provision of a sanitary protector for cow's teats, which can be successfully used both for hand milking and for milking machines.

A further object of my invention is to provide an improved sanitary protector of the above character, which will be durable and efficient in use, one that will be simple and easy to manufacture and one which can be placed upon the market at an extremely low cost.

With these and other objects in view, the invention consists in the novel construction, arrangement and formation of parts, as will be hereinafter more specifically described and claimed, and illustrated in the accompanying drawing, in which drawing, Figure 1 is a longitudinal sectional view through a milking machine teat cup showing my invention applied thereto and surrounding the teat of a cow.

Figure 1:
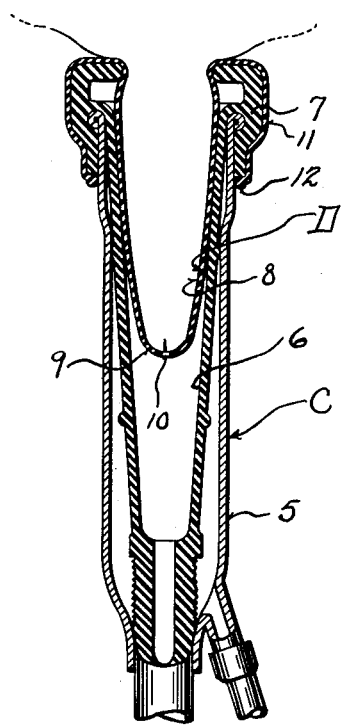

Referring to the drawing in detail, wherein similar reference characters designate corresponding parts throughout the several views, the letter C generally indicates a teat cup, which can be considered as a type now commonly used in milking machines and hence the cup will not be described in minute detail. However, as illustrated, the cup C includes the rigid cup shell 5 and the collapsible inflation 6. The outer end of the inflation 6 is provided with a cushion top 7 which engages over and around the upper end of the shell 5. The outer end of the shell can be provided with a rolled bead, as illustrated. As brought out in the objects of the specification, the inflation 6 is generally of a greater size than a cow's teat and consequently the inflation does not closely embrace or cling to the teat except at the point of juncture of the teat with the udder.

My sanitary device D includes a thin, resilient sleeve-like body 8 formed from flexible resilient rubber or the like, which will readily conform itself and cling to a cow's teat. The outer end of the sleeve like body 8 is closed by a wall 9 having a small opening 10 constituting a milk outlet. The body 8 is of a less diameter than the diameter of a cow's teat and consequently in applying the body 8 to the cow's teat, the body 8 is stretched or expanded and hence the body will cling to and closely conform to the configuration of the teat and in effect form a part of the teat during the milking operation. Where the body 8 is to be used with a milking machine cup C, it can be increased in diameter as at 11 and the peripheral edge of the open end can be reinforced by an annular rib 12. The enlarged portion 11 of the body is stretched over the upper cushion end 7 of the inflation 6 and the reinforced edge or bead 12 snaps over the edge of the cushion 7 of the inflation, and hence the exposed end of the inflation is completely covered by the portion 11 of the body.

Figure 2:
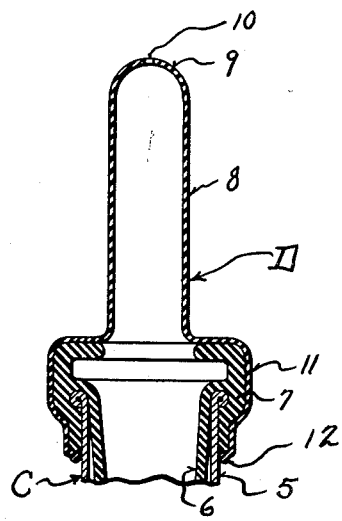
Figure 2 is a similar view after the withdrawal of the teat of the cow from the cup.
Figure 3:
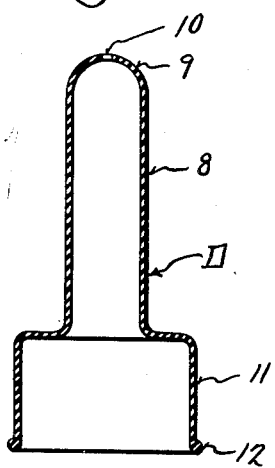
Figure 3 is a longitudinal sectional view through the novel device before being applied to the cup.

As illustrated in Figure 1, the teat of the cow is inserted in the body 8 and the teat is enclosed by the thin membrane like body. Consequently, the milk, during the milking process, will flow between the inflation 6 and the outer surface of the body 8 and the milk will not come in contact with the outer surface of the teat. As the cup is pulled from the cow's teat, the body 8 will be turned inside out, as shown in Figure 2, and the body can then be washed, if so desired, before the same is placed on another cow.

Obviously, my device D can be placed on the teats of a cow for hand milking and in which event, the hands of the milker will not come into direct contact with the cow's teat.

Figure 4:
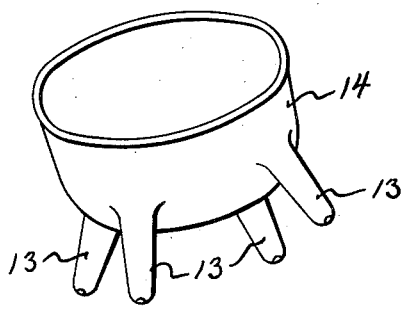
Figure 4 is a perspective view illustrating a modified form of the invention.

As is shown in Figure 4, resilient finger-like bodies 13 can be molded, or a connector 14, which is shaped to conform to the general outline of a cow's udder, can be used. This portion 14 is also formed from thin, resilient material and flexes around the udder.

Changes in details may be made, without departing from the spirit or the scope of this invention, but what is claimed as new is:

1. The combination with a teat cup including a shell and an inflation in said shell having its upper end surrounding the cup, and a sanitary protector for the teat of a cow having an inner end and an outer end comprising a resilient sleeve-like member substantially closed at said inner end and having a milk outlet therein, said member in its quiescent state being of a smaller diameter than the teat of a cow with which it is to be associated, and the outer end of said member being enlarged and surrounding the said upper end of said inflation.

2. A sanitary protector for the teats of cows during the milking process adapted to be placed on the teat prior to the insertion of the teat into the inner inflation of a teat cup shell comprising a body, including, a thin resilient sleeve having a substantially closed inner end, said substantially closer inner end having a milk outlet therein, said body being of a less diameter in its quiescent state than the teat for close gripping contact and for completely covering the teat with which it is to be associated, and an enlarged open outer end on said sleeve for surrounding the outer enclosing end of the inner inflation of the teat cup shell, whereby milk circulating between the inflation member of the cup and the teat will be prevented from coming in contact with and agitating the teat.

ARNO J. LUTH.

REFERENCES CITED

The following references are of record in the file of this patent:

UNITED STATES PATENTS

| Number | Name | Date |
| --- | --- | --- |
| 928,080 | Tatman | July 13, 1909 |
| 1,111,978 | Uebler | Sept. 29, 1914 |
| 1,260,466 | Sharples | Mar. 26, 1918 |
| 1,311,728 | Thornton | July 29, 1919 |
| 1,465,002 | Schawang | Aug. 14, 1923 |
| 1,555,504 | Krayenbuhl | Sept. 29, 1925 |
| 1,641,316 | Bruun | Sept. 6, 1927 |
| 2,462,583 | Weiby | Feb. 22, 1949 |